T. F. MANLEY.
CONVERTIBLE RECEPTACLE FOR HOT WATER AND FOUNTAIN SYRINGES.
APPLICATION FILED AUG. 28, 1915.
1,252,285. Patented Jan. 1, 1918.
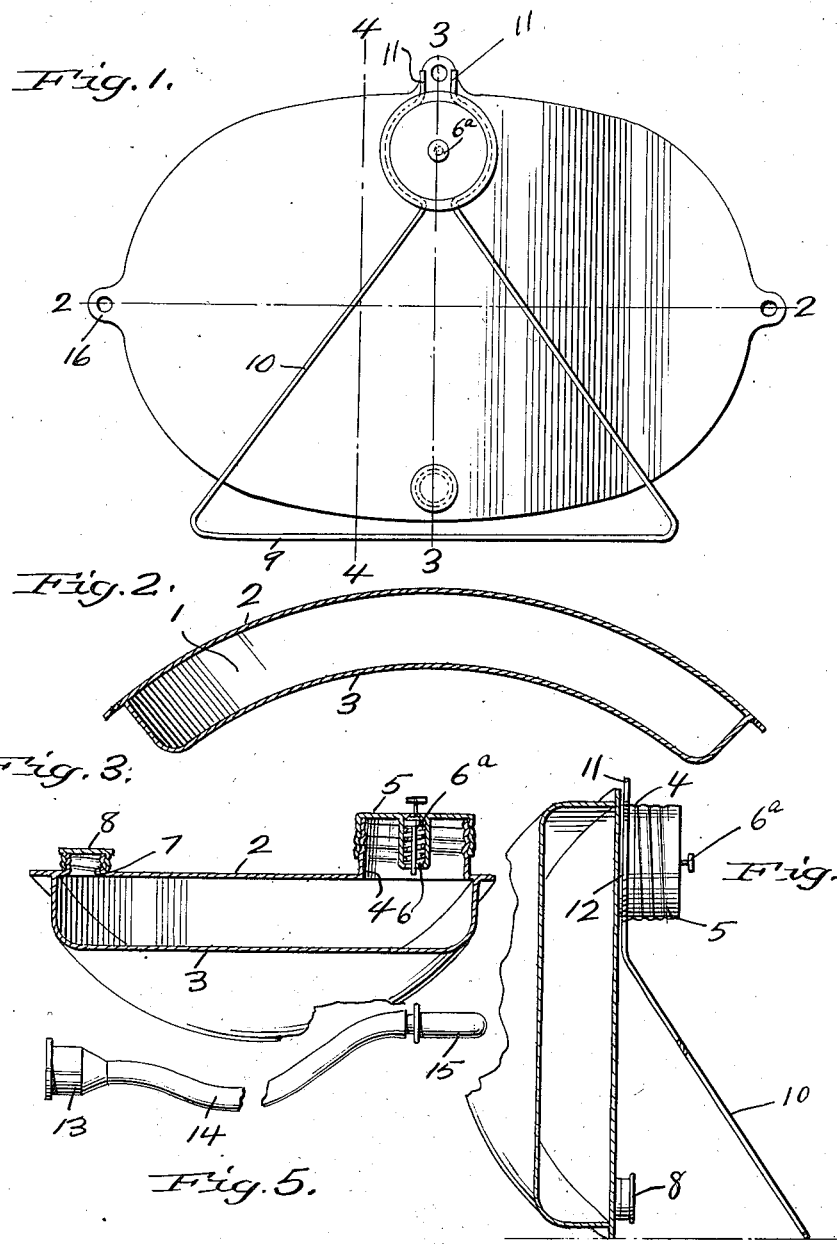
INVENTOR
Thomas F. Manley.
BY
ATTORNEY
WITNESSES

UNITED STATES PATENT OFFICE.

THOMAS FLETCHER MANLEY, OF EAST LIVERPOOL, OHIO.

CONVERTIBLE RECEPTACLE FOR HOT-WATER AND FOUNTAIN-SYRINGES.

1,252,285.   Specification of Letters Patent.   Patented Jan. 1, 1918.

Application filed August 28, 1915. Serial No. 47,829.

*To all whom it may concern:*

Be it known that I, THOMAS FLETCHER MANLEY, a citizen of the United States, residing at East Liverpool, in the county of Columbiana and State of Ohio, have invented certain new and useful Improvements in Convertible Receptacles for Hot-Water and Fountain-Syringes, of which the following is a specification.
My invention relates broadly to water bandages and more particularly to a convertible metallic receptacle for hot water and a fountain syringe.

The primary object of my invention resides in the provision of a metallic receptacle so shaped that it will conform to the natural curves of the body and thereby permit of either hot or cold applications when desired.
Another object of my invention resides in the provision of a novel supporting means for removable association with the receptacle for holding the receptacle in a substantial vertical position, as well as a syringe attachment which can be readily associated with the receptacle when desired.

Another object of my invention resides in the provision of a receptacle having an inlet and an outlet therein, the inlet cap being incidentally provided with an air vent which is used to permit of the efficient operation of the device when used as a fountain syringe.

A still further object of my invention resides in the provision of a device of the character described that is simple in construction, efficient in operation and one that can be manufactured and placed on the market at a minimum cost.
Other objects as well as the nature, characteristic features and scope of my invention will be more readily understood from the following description taken in connection with the accompanying drawings and pointed out in the claims forming a part of this specification.

In the drawings:—

Figure 1 is a side elevational view showing the convex side of the receptacle, when used as a compress, the supporting frame being associated with the collar;

Fig. 2 is a longitudinal sectional view of my invention taken on line 2—2 of Fig. 1, showing to advantage the concave and convex sides of the receptacle;

Fig. 3 is a transverse sectional view taken on line 3—3 of Fig. 1;

Fig. 4 is a vertical sectional view of the receptacle taken on section lines 4—4 of Fig. 1;

Fig. 5 is a plan view of the fountain syringe attachment.

Referring more particularly to the drawing in which similar reference numerals designate like and corresponding parts throughout the various views, I provide my improved metallic receptacle 1 with a convex wall 2 and a concave wall 3, arranged in uniform spaced relation throughout its length with the convex wall. The convex wall is provided adjacent the top of the receptacle with an opening about which is formed an exteriorly screw threaded collar 4. This arrangement serves as an inlet to permit of the filling of the receptacle with either hot or cold water as desired. An interiorly screw threaded cap 5 is engaged upon the collar 4 for closing the inlet opening, said cap having an air vent 6 therein. An automatic valve mechanism 6ª normally closes communication through the vent 6 and opening in the cap 5, the mechanism being equipped with a head exteriorly of the receptacle 1 through the medium of which the mechanism is actuated in order to open the vent and relieve the vacuum on the interior of the receptacle with an obvious result. The convex wall is also provided adjacent its bottom or lower edge with a small opening about which is formed a small annular collar 7, while a cap 8 is arranged in screw threaded engagement with the collar 7 for closing the opening. This opening serves as an outlet as well as means for removably receiving the fountain syringe attachment to be described. As is apparent the convex and concave walls 2 and 3 respectively conform substantially to the natural curves of the body and in some instances it is found convenient to support the receptacle in position.

In accomplishing the before mentioned purpose of supporting the receptacle in substantial vertical position so it can be readily retained in its proper position against the body of the patient, I have provided a triangular supporting frame formed preferably from a single piece of light rod metal. This frame includes a base 9 and sides 10. The sides are extended at an acute angle and in spaced parallel relation to each other from the vertex opposite the base to provide arms 11, each of which are bent adjacent their free ends in a semi-circular form to provide collar engaging portions 12. As is readily apparent by engaging the free ends of the arms 11, the collar engaging portions can be forced away from each other and disengaged from the collar 4.

The fountain syringe attachment comprises an internally screw threaded collar 13, a tube 14 and a nozzle 15. In associating this attachment with the receptacle, the cap 8 is removed and the collar 13 is associated with the collar 7. Also the air vent cap 6 is removed to permit a free circulation of water from the receptacle through the tube 14. In use, it might be desirable to associate the supporting frame with the collar 4 to maintain the receptacle in a substantial vertical position. The advantage of this resides in the fact that the gravity feed will produce better results.

One of the walls of the receptacle is provided with a plurality of ears which permit of the device being hung from a nail or the like should it be desired. Snaps on elastic webbing may be engaged in the ears for holding the receptacle in various positions.

Although I have shown and described the preferred embodiment of my invention, I desire it to be understood that I do not desire to be limited to the exact details shown, however, I desire that great stress be laid upon the arrangement of the coöperation existing between the receptacle supporting frame and the syringe attachment.

From the above description taken in connection with the accompanying drawing, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of parts may be made within the scope of the appended claims and without sacrificing any of the advantages of my invention.

Having thus fully described my invention, what I claim as new and desire to secure by Letters Patent is:—

1. A device of the character described including a liquid containing receptacle having an inlet and an outlet, collars formed about the inlet and outlet, closure caps associated with the collars and a triangular supporting frame removably associated with one of the collars for retaining the receptacle in a substantially vertical position.

2. A device of the character described including a receptacle having an inlet and an outlet, an exteriorly extending collar formed at the inlet, means for closing the inlet, a fountain syringe attachment associated with the outlet and a supporting frame for maintaining the receptacle in a substantial vertical position to facilitate the efficient operation of the syringe attachment, said frame formed from a single piece of wire including a base, sides extending from the base and collar engaging arms projecting angularly from the sides and in spaced relation with each other.

3. A substantially flat water receptacle having an inlet and an outlet opening, an externally projecting collar formed about one of said openings, said receptacle being adapted to rest on one edge thereof in a vertical position, a supporting leg for maintaining the receptacle in a vertical position and having spring arms adapted to engage about said collar.

In testimony whereof I affix my signature in the presence of two witnesses.

THOMAS FLETCHER MANLEY.

Witnesses:
ALMA M. WILLIAMS,
R. G. THOMPSON.